United States Patent
Chifor et al.

(10) Patent No.: US 12,170,605 B1
(45) Date of Patent: Dec. 17, 2024

(54) METHODS, SYSTEMS, AND COMPUTER READABLE MEDIA FOR INJECTING TEST PLUGINS INTO USER-SPACE NETWORK PROTOCOL STACK EXECUTING ON DEVICE UNDER TEST (DUT) AND EXECUTING TEST PLUGINS DURING TESTING OF DUT

(71) Applicant: Keysight Technologies, Inc., Santa Rosa, CA (US)

(72) Inventors: Bogdan-Cosmin Chifor, Bucharest (RO); Peter J. Marsico, Chapel Hill, NC (US)

(73) Assignee: KEYSIGHT TECHNOLOGIES, INC, Santa Rosa, CA (US)

( * ) Notice: Subject to any disclaimer, the term of this patent is extended or adjusted under 35 U.S.C. 154(b) by 0 days.

(21) Appl. No.: 18/234,855

(22) Filed: Aug. 16, 2023

(30) Foreign Application Priority Data

Jul. 31, 2023   (RO) .............................. a 2023 00417

(51) Int. Cl.
  *H04L 43/50*   (2022.01)
  *G06F 9/445*   (2018.01)
  *H04L 43/065*  (2022.01)

(52) U.S. Cl.
  CPC .......... *H04L 43/50* (2013.01); *G06F 9/44526* (2013.01); *H04L 43/065* (2013.01)

(58) Field of Classification Search
  None
  See application file for complete search history.

(56) References Cited

U.S. PATENT DOCUMENTS

| | | | |
|---|---|---|---|
| 8,726,394 B2* | 5/2014 | Maor | G06F 11/3688 717/124 |
| 11,474,823 B2 | 10/2022 | Sommers | |
| 12,019,505 B2* | 6/2024 | Singh | G06F 9/542 |
| 2008/0137543 A1 | 6/2008 | Mitra | |
| 2013/0219222 A1* | 8/2013 | Xue | G06F 11/3688 714/32 |

(Continued)

FOREIGN PATENT DOCUMENTS

WO   2023017350 A1   2/2023

OTHER PUBLICATIONS

De Coninck et al. The Case for Protocol Plugins, 7 pages, 2019 (Year: 2019).*

(Continued)

*Primary Examiner* — Joshua Joo

(57) ABSTRACT

A method for injecting a test plugin into a user-space network protocol stack executing on a device under test (DUT) and executing the test plugin during testing of the DUT includes transmitting, from a test system and to a first DUT, a first test plugin. The method further includes injecting the first test plugin into a user-space network protocol stack executing on the first DUT while the user-space network protocol stack is executing. The method further includes executing the first test plugin. The method further includes, while the first test plugin is executing, transmitting test packets to the DUT and receiving packets from the DUT. The method further includes reporting, from the DUT and to the test system, results generated from execution of the first test plugin.

21 Claims, 4 Drawing Sheets

(56) References Cited

U.S. PATENT DOCUMENTS

| | | | |
|---|---|---|---|
| 2015/0100831 A1* | 4/2015 | Nanjundappa | G06F 11/3688 714/38.1 |
| 2015/0331779 A1* | 11/2015 | Subramaniam | G06F 11/3688 717/124 |
| 2016/0309434 A1* | 10/2016 | Regev | H04L 43/106 |
| 2019/0306282 A1* | 10/2019 | Masputra | G06F 9/44526 |
| 2019/0327315 A1* | 10/2019 | Grooters | G06F 21/64 |
| 2020/0213212 A1 | 7/2020 | Dillon et al. | |
| 2020/0403905 A1 | 12/2020 | Allen et al. | |
| 2021/0314247 A1* | 10/2021 | Wright | H04L 43/14 |
| 2022/0147542 A1 | 5/2022 | Asgar et al. | |
| 2023/0017350 A1 | 1/2023 | Chanemougame et al. | |
| 2023/0071504 A1* | 3/2023 | Wright | G06F 11/3696 |
| 2023/0119536 A1* | 4/2023 | Cosentino | G06F 11/3433 718/104 |
| 2023/0155916 A1* | 5/2023 | Shen | H04L 43/0864 709/224 |
| 2023/0221975 A1 | 7/2023 | Sommers et al. | |
| 2024/0028443 A1* | 1/2024 | Singh | G06F 11/079 |

OTHER PUBLICATIONS

DeConinck, et al., "The Case for Protocol Plugins," UCLouvain, Belgium 2023.

De Coninck, et al., "Pluginizing QUIC," In SIGCOMM '19: 2019 Conference of the ACM Special Interest Group on Data Communication, Aug. 19-23, 2019, Beijing, China. pp. 59-74.

Hawkeye—Active Network Monitoring Platform, pp. 1-9, Apr. 28, 2023. 7019-0137EN.

Hawkeye on the Cisco Catalyst 9300: CLI Instructions for Running a Docker Instance, Sep. 30, 2019, 7119-1134EN.

eBPF Documentation, www. (2023).

Pluginized_QUIC_2021_UCLouvain (https://pquic.org).

Piraux, M. et al., "QUIC_Plugins" pp. 1-14, Mar. 9, 2020.

"eBPF Library Ecosystem Overview: Go, Rust, Python, C and Other Languages," The Libraries, https://github.com/kcq/ebpf-libraries/blob/master/ebpfSummit_2021-_eBPF_Library Ecosystem_ Overview.md, pp. 1-9 (Jan. 10, 2022).

Mayer et al., "Performance Monitoring with H/\2: Hybrid Kernel/eBPF data plane for SRv6 based Hybrid SDN," Computer Networks, vol. 185, pp. 1-10 (2021).

"What is eBPF?," eBPF, https://ebpf.io, pp. 1-5 (2021).

Suo et al., "Demo/Poster Abstract: Efficient and Flexible Packet Tracing for Virtualized Networks using eBPF," 2018 IEEE Conference on Computer Communications Poster and Demo (INFOCOM'18 Poster/Demo), pp. 1-2 (2018).

"BPF, eBPF, XDP and Bpfilter . . . What are These Things and What do They Mean for the Enterprise?," Netronome, https://www.netronome.com/blog/bpf-ebpf-xdp-and-bpfilter-what-are-these-things-and-what-do-they-mean-enterprise/, pp. 1-14 (Apr. 16, 2018).

"BPF and XDP Reference Guide," Cilium, pp. 1-115 (2017).

"A thorough introduction to eBPF," LWN.net, pp. 1-9 (Dec. 2, 2017).

Brendan Gregg—"Linux Extended BPF (eBPF) Tracing Tools," https://www.brendangregg.com/ebpf.html, pp. 1-32 (Dec. 28, 2016).

Ahmed et al., "InKeV: In-Kernel Distributed Network Virtualization for DCN," ACM SIGCOMM Computer Communication Review, vol. 46, Issue 3, pp. 1-6 (Jul. 2016).

Miano, et al., "A Framework for eBPF-Based Network Functions in an Era of Microservices", IEEE Transactions On Network and Service Management, vol. 18, No. 1, Mar. 2021 pp. 133-151 (Year: 2021).

Non-Final Office Action for U.S. Appl. No. 17/572,568 (Jun. 14, 2024).

Hemminger, "NETDEV 2.2 The Technical Conference on Linux Networking", Nov. 8, 2017 URL: https://www.youtube.com/watch?v=RY6mzwHUKCA.

Search Report for GB Patent Application Serial No. 2300174.6 (Jun. 29, 2023).

* cited by examiner

METHODS, SYSTEMS, AND COMPUTER READABLE MEDIA FOR INJECTING TEST PLUGINS INTO USER-SPACE NETWORK PROTOCOL STACK EXECUTING ON DEVICE UNDER TEST (DUT) AND EXECUTING TEST PLUGINS DURING TESTING OF DUT

CROSS-REFERENCE TO RELATED APPLICATION

This application claims the priority benefit of Romanian Patent Application Number a 2023 00417, filed Jul. 31, 2023, the disclosure of which is incorporated herein by reference in its entirety.

TECHNICAL FIELD

The subject matter described herein relates to testing network devices. More particularly, the subject matter described herein relates to injecting test plugins into a user-space network protocol stack executing on a DUT and executing the test plugins during testing of the DUT to increase observability of the DUT during the testing.

BACKGROUND

Testing of network devices typically involves a network traffic generator generating and transmitting test packets to a DUT, receiving packets from the DUT, and measuring one or more operational aspects, such as performance and/or resilience, of the DUT based on statistics generated from the transmitted and received packets. While such a test setup works well for measuring overall performance of the DUT, the DUT still appears as a black box to the test system. For example, round trip packet latency and jitter can be measured by transmitting packets to a DUT and receiving packets from a DUT. However, the cause of the latency and/or jitter cannot easily be discovered only by analyzing packet transmission and receipt times.

Accordingly, in light of these and other difficulties, there exists a need for improved methods, systems, and computer readable media for testing a DUT that provides for increased observability of operation of the DUT.

SUMMARY

A method for injecting a test plugin into a user-space network protocol stack executing on a device under test (DUT) and executing the test plugin during testing of the DUT includes transmitting, from a test system and to a first DUT, a first test plugin. The method further includes injecting the first test plugin into a user-space network protocol stack executing on the first DUT while the user-space network protocol stack is executing. The method further includes executing the first test plugin. The method further includes, while the first test plugin is executing, transmitting test packets to the DUT and receiving packets from the DUT. The method further includes reporting, from the DUT and to the test system, results generated from execution of the first test plugin.

According to another aspect of the subject matter described herein, the method for injecting a test plugin into a user-space network protocol stack executing on DUT and executing the test plugin during testing of the DUT includes installing a test interface on the first DUT, where transmitting the first test plugin to the first DUT includes transmitting the first test plugin to the first DUT via the test interface and reporting the results generated from execution of the first test plugin includes transmitting the results to the test system via the test interface.

According to another aspect of the subject matter described herein, injecting the first test plugin into the user-space network protocol stack executing on the first DUT includes injecting the first test plugin into a pluginized user-space network protocol stack executing on the first DUT.

According to another aspect of the subject matter described herein, injecting the first test plugin into the pluginized user-space network protocol stack executing on the first DUT includes injecting the first test plugin into a pluginized QUIC [1, 2] network protocol stack executing on the first DUT.

According to another aspect of the subject matter described herein, transmitting the first test plugin to the first DUT includes transmitting machine language code to the first DUT.

According to another aspect of the subject matter described herein, transmitting the first test plugin to the first DUT includes transmitting a Berkeley packet filter (BPF) test plugin to the first DUT.

According to another aspect of the subject matter described herein, transmitting the first test plugin to the first DUT includes transmitting computer code for generating at least one performance measurement of the first DUT.

According to another aspect of the subject matter described herein, executing the first test plugin on the first DUT includes executing the first test plugin within the same process as the user-space network protocol stack.

According to another aspect of the subject matter described herein, the method for injecting a test plugin into a user-space network protocol stack executing on DUT and executing the test plugin during testing of the DUT includes, at the test system, receiving the results generated from the execution of the first test plugin on the first DUT and, based on the results, selecting and transmitting a second test plugin to the first DUT, wherein the second test plugin is different from the first test plugin.

According to another aspect of the subject matter described herein, the method for injecting a test plugin into a user-space network protocol stack executing on DUT and executing the test plugin during testing of the DUT includes, at the test system, receiving the results generated from the execution of the first test plugin on the first DUT and, based on the results, selecting and transmitting a second test plugin to a second DUT, wherein the second DUT is different from the first DUT.

According to another aspect of the subject matter described herein, a system for injecting a test plugin into a user-space network protocol stack executing on a device under test (DUT) and executing the test plugin during testing of the DUT includes a first test plugin for testing or measuring an operational aspect of a first DUT. The system further includes a test platform including at least one processor and a memory. The system further includes a test controller executable by the at least one processor for transmitting the first test plugin to the first DUT, transmitting test packets to the first DUT and receiving packets from the first DUT. The system further includes a test interface located on the first DUT for injecting the first test plugin into a user-space network protocol stack executing on the first DUT while the user-space network protocol stack is executing, wherein the first DUT executes the first test plugin while the first DUT is processing the test packets and the test interface reports, to the test controller, results generated from execution of the first test plugin.

According to another aspect of the subject matter described herein, the user-space network protocol stack comprises a pluginized user-space network protocol stack.

According to another aspect of the subject matter described herein, the pluginized user-space network protocol stack comprises a pluginized QUIC network protocol stack.

According to another aspect of the subject matter described herein, the first test plugin comprises machine language code.

According to another aspect of the subject matter described herein, the first test plugin comprises a Berkeley packet filter (BPF) test plugin.

According to another aspect of the subject matter described herein, the first test plugin is configured to generate at least one performance measurement of the first DUT.

According to another aspect of the subject matter described herein, the first test plugin is configured to execute within the same process as the user-space network protocol stack.

According to another aspect of the subject matter described herein, the test controller is configured to receive the results generated from the execution of the first test plugin on the first DUT, and, based on the results, select and transmit a second test plugin to the first DUT, wherein the second test plugin is different from the first test plugin.

According to another aspect of the subject matter described herein, the test controller is configured to receive the results generated from the execution of the first test plugin on the first DUT, and, based on the results, select and transmit a second test plugin to a second DUT, wherein the second DUT is different from the first DUT.

According to another aspect of the subject matter described herein, a non-transitory computer readable medium having stored thereon executable instructions that when executed by a processor of a computer control the computer to perform steps is provided. The steps include transmitting, from a test system and to a device under test (DUT), a test plugin. The steps further include injecting the test plugin into a user-space network protocol stack executing on the DUT while the user-space network protocol stack is executing. The steps further include executing the test plugin. The steps further include, while the test plugin is executing, transmitting test packets to the DUT and receiving packets from the DUT. The steps further include reporting, from the DUT and to the test system, results generated from execution of the test plugin.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
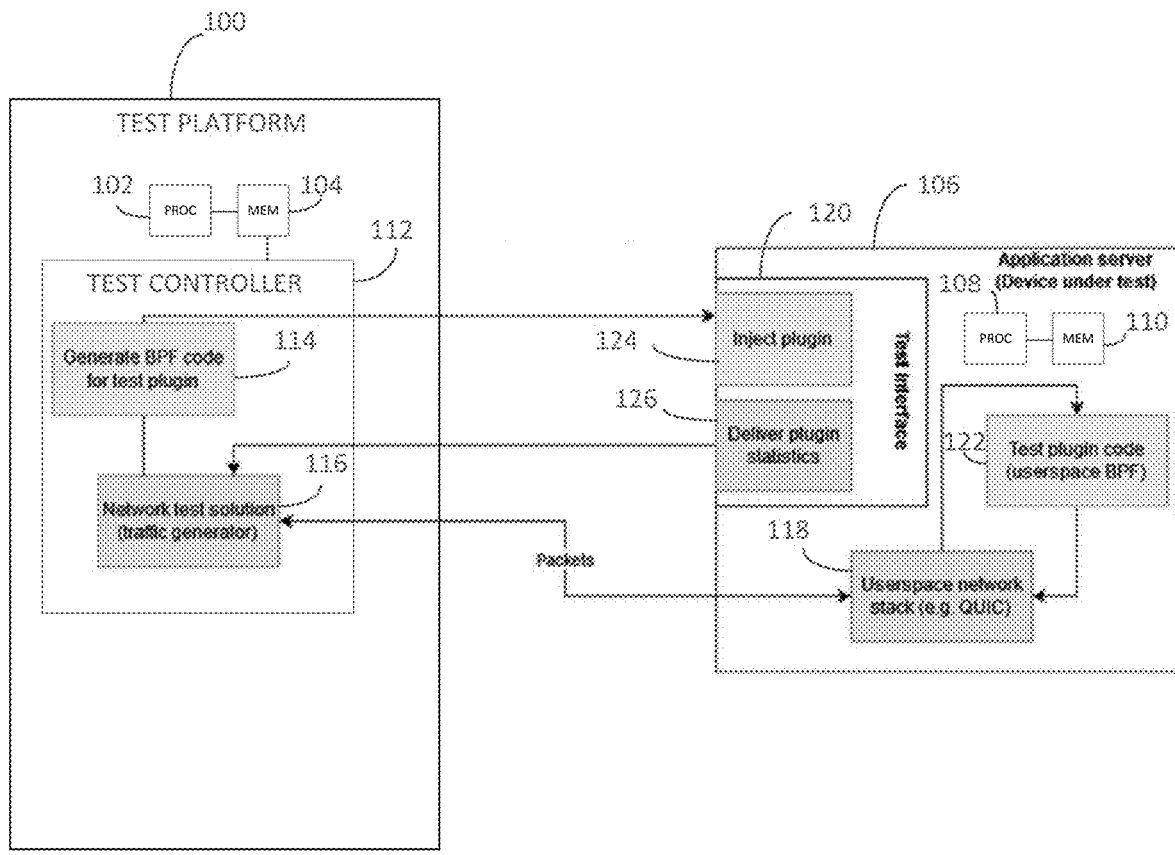
FIG. 1 is a network diagram illustrating an exemplary system for injecting a test plugin into a user-space network protocol stack executing on a DUT and executing the test plugin to measure performance or another operational aspect of the DUT.

A general network test solution consists of a traffic generator and a DUT. Such a system allows inspecting different metrics of the DUT when processing different types of traffic. DUTs can be networking equipment that routes or switches packets or an application server, which terminates a connection with the traffic generator, receives packets from the traffic generator, and responds back to the traffic generator, which typically simulates one or more network clients. In the latter case, the network test system can gather statistics only from a simulated client perspective, given that the DUT is a closed system which responds to queries.

When a DUT is an application server, the network test system would benefit from injecting custom logic on the server side to increase observability. Unfortunately, this is difficult to achieve due to the closed nature and particularities of each application server DUT.

The subject matter described herein includes a system where the network test solution injects a test plugin in the network protocol stack of the application server DUT. Recent advancements in programmable network stacks and interpreted code offer the technical basis for such a solution. More specifically, solutions, such as the pluginized QUIC protocol, allow adding plugins to the QUIC protocol implementation. These plugins can come in the form of machine code (e.g., user-space Berkely packet filters (BPFs)), which can be executed in different stages of the network protocol stack in which the plugins are injected. Examples of such plugins include forward error correction plugins, congestion generating or measurement plugins, latency measurement plugins, etc., the possibilities being unlimited given that a plugin is implemented as configurable machine code, which is interpreted/executed by the machine which runs the network protocol stack.

The subject matter described herein leverages this infrastructure and can include a network test plugin which measures different test parameters. This type of plugin can be a machine language code plugin (such as a user-space BPF), which can gather various statistics or inspect/modify different fields from the packets being transmitted or received by the DUT.

The subject matter described herein also includes a programmable network test interface for the DUT, through which the network test system can connect to the DUT before the test and transmit the plugin to the DUT. This interface can install the plugin in the local network stack of the DUT and report back the results when queried by the test system. In one example, the test interface can be a web interface, such as a representational state transfer (REST) service interface, which responds to commands from the network test system when the DUT is configured in test mode. The test interface may have a standardized format to provide compatibility with different network test solutions. In an alternate example, the test interface can be a gRPC interface or an XML interface.

FIG. 1 is a network diagram illustrating an exemplary system for injecting a test plugin into a user-space network protocol stack executing on a DUT and executing the test plugin to measure performance or other operational aspect of the DUT. Referring to FIG. 1, the system includes a test platform 100 including at least one processor 102 and a memory 104. Test platform 100 may be any suitable computing platform for executing tests to test one or more DUTs, such as DUT 106. In the illustrated example, DUT 106 comprises an application server. However, DUT 106 can be any type network device that processes or forwards packets. Examples of other network devices that may be configured as DUTs include routers, switches, firewalls, network address translators (NATs), etc. DUT 106 also includes at least one processor 108 and memory 110.

Test platform 100 includes a test controller 112. Test controller 112 allows a user to generate test plugins, such as test plugin 114, and transmits the test plugins to DUT 106 were the plugins are injected in a user-space network protocol stack 118. Injecting the test plugins into user-space network protocol stack means that the test plugins are inserted into the user-space network protocol stack 118 while user-space network protocol stack 118 is executing and without halting execution of user-space network protocol stack 118. Injecting the test plugins into the user-space network protocol stack while the user-space network protocol stack is executing allows the user-space network protocol stack and the test plugins to execute as part of the same process. Executing the user-space network protocol stack and the test plugins as part of the same process makes measurements, such as statistical measurements of DUT performance, more accurate than such measurements would be if the DUT were required to switch processes to execute the test plugins.

As described above, in one example, the test plugins may be implemented using Berkeley packet filters. Examples of test plugins that are used to test or measure one or more operational aspects of DUT 106 will be described below. Test controller 112 further includes a traffic generator 116 for transmitting test packets to and receiving packets from DUT 106. Traffic generator 116 may be any suitable network traffic generator designed to generate test traffic, transmit the test traffic to DUT 106, and receive either responsive traffic from DUT 106 or traffic that is forwarded by DUT 106. Test controller 112 may be implemented using computer executable instructions stored in memory 104 and executed by processor 102.

DUT 106 includes a test interface 120 for receiving test plugins from test controller 112 and injecting the test plugins, such as test plugin 122, into user-space network protocol stack 118 while user-space network protocol stack is executing. The injection of test plugin 122 into the executing user-space network protocol stack 118 is indicated by reference numeral 124. Another function of test interface 120 is to deliver plugin-generated statistics 126 to traffic generator 116 of test controller 112. In one example, test interface 120 may be a web interface that receives test plugins sent to URLs, injects the test plugins into the executing user-space network protocol stack 118, and reports statistics resulting from executing of the test plugins while user-space network protocol stack 118 is receiving and processing test packets generated by traffic generator 116.

Test interface 120 may be implemented using computer executable instructions stored in memory 110 and executed by processor 108. Similarly, user-space network protocol stack 118 and test plugin 126 may also be implemented using computer executable instructions stored in memory 110 and executed by processor 108.

Figure 2:
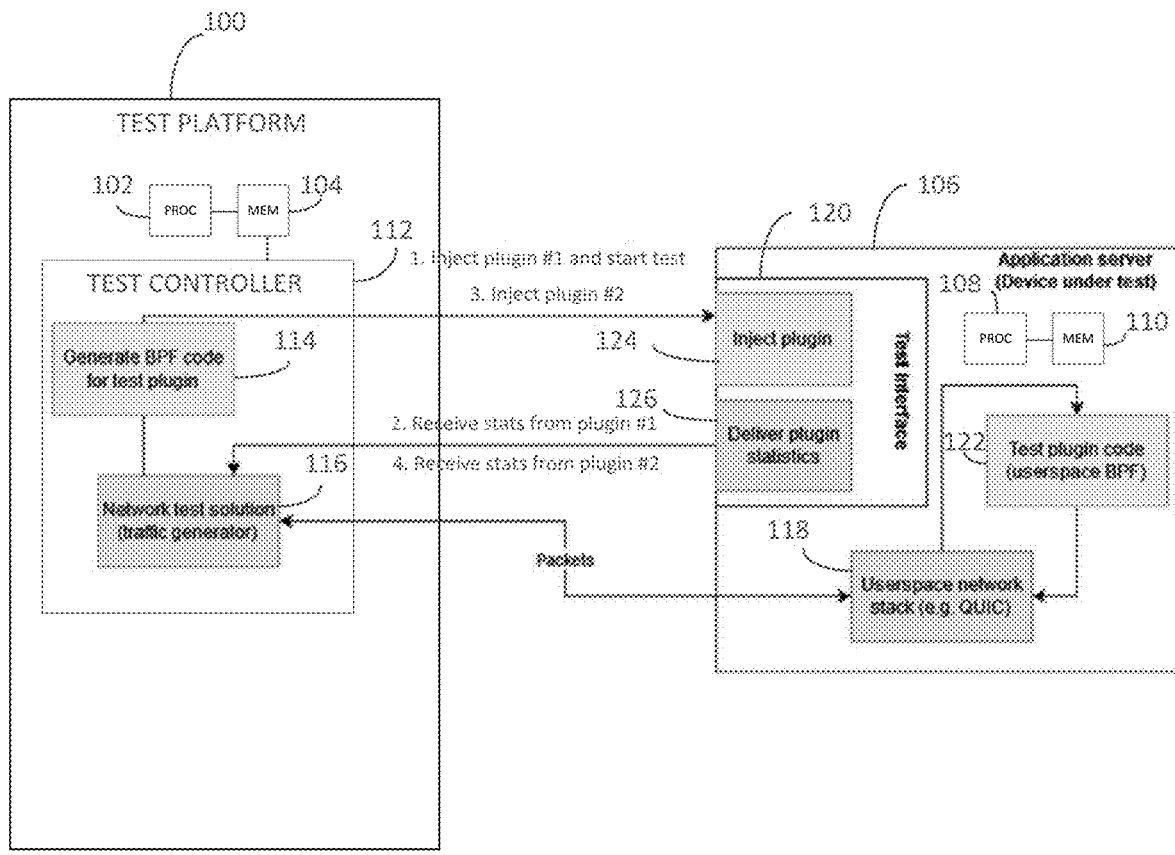
FIG. 2 is a network diagram illustrating the system of FIG. 1 where the test system receives results generated from executing a first test plugin in a user-space network protocol stack executing on the DUT and uses the results to select and inject a second test plugin into the user-space network protocol stack executing on the DUT.

FIG. is a network diagram illustrating the system of FIG. 1 where the test system receives results generated from the executing of a first test plugin in the user-space network protocol stack on the DUT and uses the results to select and inject a second test plugin into the user-space network protocol stack executing on the DUT. Referring to FIG. 2, in step 1, test controller 112 sends a first plugin, plugin #1, to DUT 106 and starts a test of DUT 106. DUT 106 injects the plugin into user-space network protocol stack 118, which processes the packets transmitted during the test. Plugin #1 generates statistics, such as latency, of DUT 106 in processing the packets. In step 2, test interface 120 delivers the statistics generated by plugin #1 to test controller 112. Test controller 112 analyzes the statistics generated by plugin #1 and selects a new test plugin, plugin #2, which may generate different statistics from plugin #1. For example, plugin #1 may be designed to generate statistics regarding latency at one layer of the network protocol stack, and plugin #2 may be designed to generate statistics about the latency of a different layer of the network protocol stack. In step 3, test controller 112 transmits plugin #2 to DUT 106, and DUT 106 injects plugin #2 into user-space network protocol stack 118.

As described above, is not necessary to halt execution of network protocol stack 118 or to stop and restart the test to the execute test plugins. Using Berkley packet filters and a pluginized user-space network protocol stack, plugins can be injected into an executing process with halting the process or switching processes. As a result, measurements made are more accurate and more efficiently generated than such measurements would be if they were made from different processes and/or required restarting of test. Continuing with the example, plugin #2 generates statistics of DUT 106 resulting from processing of packets during the test. In step 4, test interface 120 reports the statistics generated by plugin #2 to test controller 112.

Figure 3:
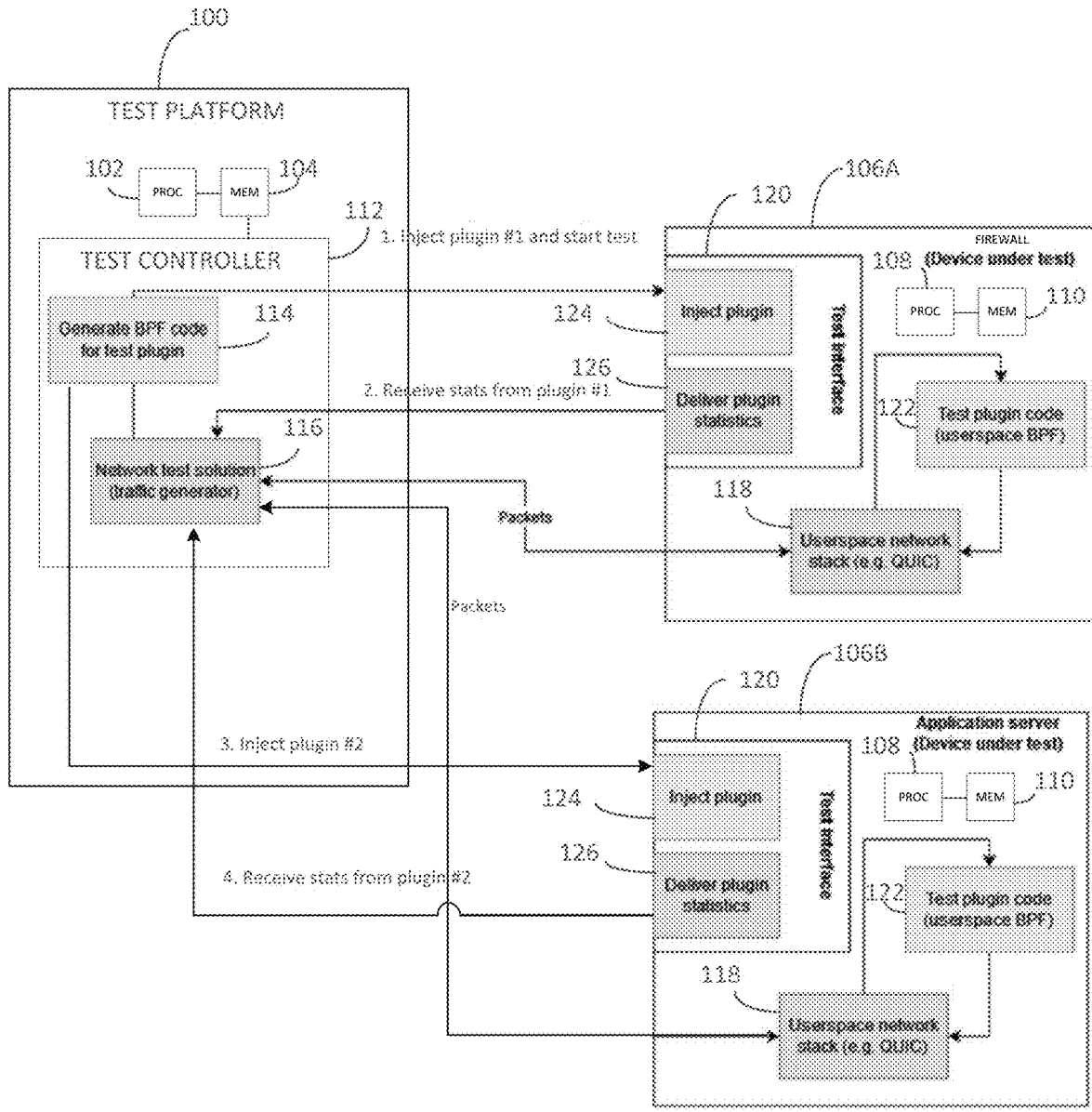
FIG. 3 is a network diagram illustrating an example where the test system receives results generated from executing a first test plugin on the DUT and uses the results to select and inject a second test plugin into a user-space network protocol stack executing on a different DUT.

In yet another example, results of execution of one test of one DUT reported by one plugin are used to select the same or a different plugin to test a different DUT. FIG. 3 is a network diagram illustrating an example where the test system receives results generated from executing a first test plugin in the user-space network protocol stack on the DUT and uses the results to select and inject a second test plugin into the user-space network protocol stack executing on a different DUT. Referring to FIG. 3, in step 1, test controller 112 sends a first plugin, plugin #1, to a first DUT 106A and starts a test of DUT 106A. DUT 106A injects the plugin into user-space network protocol stack 118, which processes the packets transmitted during the test. Plugin #1 generates statistics, such as latency, of DUT 106A in processing the packets. In step 2, test interface 120 delivers the statistics generated by plugin #1 to test controller 112. Test controller 112 analyzes the statistics generated by plugin #1 and selects a new test plugin, plugin #2. For example, if DUT 106A is a firewall and a second DUT 106B is an application server, plugin #1 may be designed to generate statistics regarding latency of the firewall, and plugin #2 may be designed to generate statistics about the latency of the application server. In step 3, test controller transmits plugin #2 to DUT 106B, and DUT 106B injects the plugin #2 into user-space network protocol stack 118 of DUT 106B. In step 4, DUT 106B executed plugin #2 and reports results of the execution to test controller 112 via test interface 120.

Figure 4:
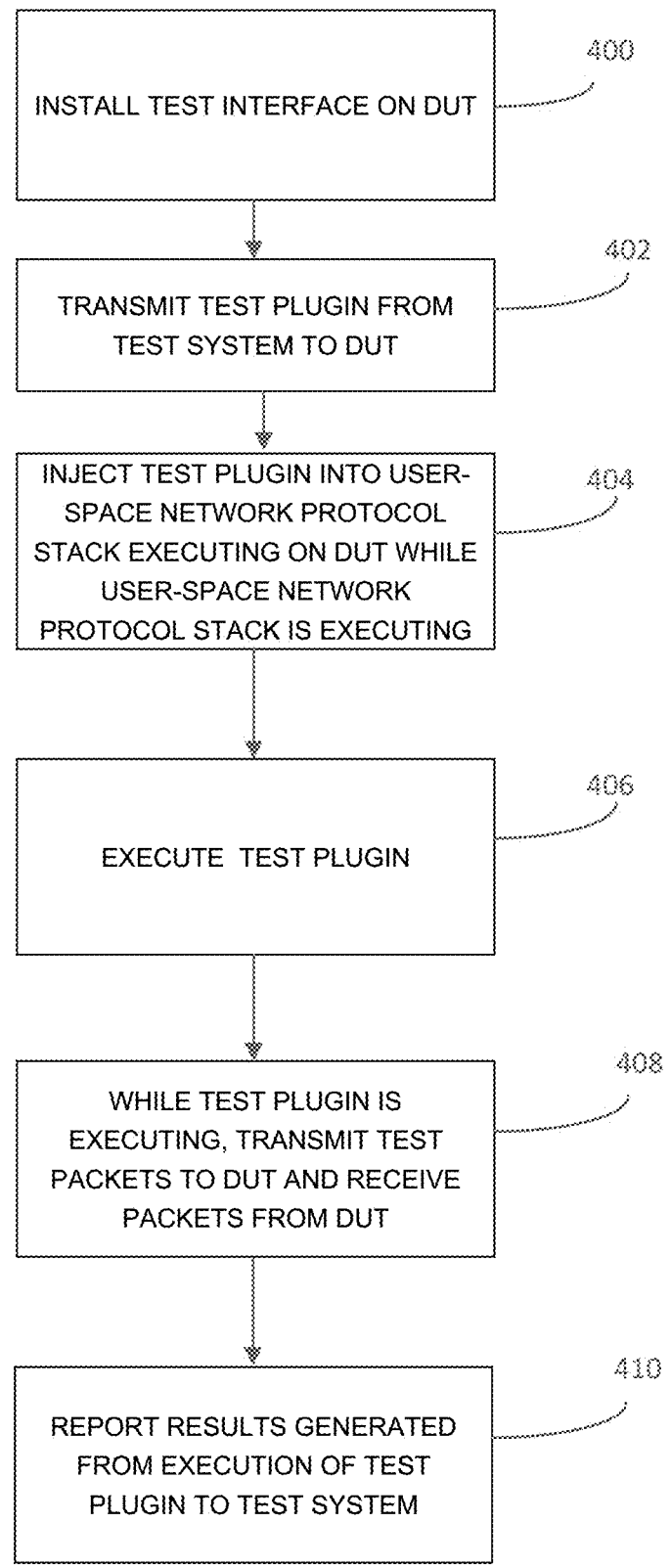
FIG. 4 is a flow chart illustrating an exemplary process for injecting a test plugin into a user-space network protocol stack executing on a DUT and executing the test plugin to measure performance or other operational aspect of the DUT.

FIG. 4 is a flow chart illustrating an exemplary process for injecting a test plugin into a user-space network protocol stack executing on a DUT and executing the test plugin to test or measure one or more operational aspects of the DUT. Referring to FIG. 4, in step 400, the process includes installing a test interface on a DUT. For example, a test engineer or other user may install a test interface, such as a web interface, on the DUT for purposes of communicating with the test controller.

In step 402, the process includes transmitting a test plugin from the test system to the DUT. For example, test controller 112 may transmit one or more test plugins to DUT 106 via test interface 120. The following are pseudocode examples of test plugins that may be used to test and measure performance of DUT 106.

---
Test Plugin Example 1
---
```
// Measure how fast the application server transmits a server hello after
receiving a client hello
if (client_hello_received)
        start_time = current_time( );
if (server_hello_transmitted) {
        end_time = current_time( );
        save_latency(end_time - start_time);
}
```
---

Test Plugin Example 2
```
    //See how the local packet decryption time is correlated
      with the packet size
    packet=received_packet ( );
    start_time=current_time ( );
    decrypted_packet=decrypt_packet ( );
    end_time=current_time ( );
    save_statistics (packet.length( ), end_time-start_time);
    packets++;
```

---
Test Plugin Example 3
---
```
// Every N packets report back the stats in real time for the traffic
generator to adjust the packet length
if (packets == N) {
        packets = 0;
        transmit_statistics_to_traffic_generator( );
}
process_packet(decrypted_packet);
```
---

In the examples above, Test Plugin Example 1 measures the delay between a server transmitting a server hello message after the server receives a client hello message. Test Plugin Example 2 measures the correlation between decryption time and packet length. Test Plugin Example 3 reports packet statistics for every N packets received and adjusts packet length. It should be noted that the test plugins of Examples 1-3 are provided for illustrative purposes only, and different test plugins may be created and injected into a user-space network protocol stack without departing from the scope of the subject matter described herein. It should also be noted that the source code of the test plugins will be compiled into machine language code before being injected into the user-space network protocol stack on the DUT. The compiler may be located on the test system or on the DUT.

Returning to FIG. 4, in step 404, the process includes injecting the test plugin into a user-space network protocol stack executing on the DUT while the user-space network protocol stack is executing. For example, one or more test plugins may be injected into a pluginized user-space network protocol stack, such as a pluginized QUIC protocol stack, while the user-space network protocol stack is executing and without halting executing of the user-space network protocol stack.

In step 406, the process includes executing the test plugin. For example, DUT 106 may execute the code of the test plugin at the point at which the test plugin code was inserted into the user-space network protocol stack and within the same process as the user-space network protocol stack.

In step 408, the process includes, while the test plugin is executing, transmitting test packets to the DUT and receiving packets from the DUT. For example, traffic generator 120 may transmit test packets to DUT 106 while DUT 106 is executing user-space network protocol stack 118 and test plugin code.

In step 410, the process includes reporting, to the test system, results generated from execution of the test plugin. For example, the test plugin may generate statistics regarding the packets being processed during the test and provide the statistics to test interface 120. Test interface 120 may transmit the statistics to test controller 112 over any suitable connection, such as a web connection.

Advantages

The test system described herein increases the observability when testing network applications and ultimately will improve the resilience and performance of network applications. Moreover, the subject matter described herein provides flexibility because the network test system can generate or select different test plugins on the fly on the fly and inject the test plugins into the DUT (e.g., the test plugins can have different code based on different user configurations or the user can add custom test plugin code).

The disclosure of each of the following references is incorporated herein by reference in its entirety.

REFERENCES

[1] https://www.ietf.org/archive/id/draft-piraux-quic-plugins-00.html
[2] https://pquic.org/

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for injecting a test plugin into a user-space network protocol stack executing on a device under test (DUT) and executing the test plugin during testing of the DUT, the method comprising:

transmitting, from a test system and to a first DUT, a first test plugin;

injecting the first test plugin into a user-space network protocol stack executing on the first DUT while the user-space network protocol stack is executing;

executing the first test plugin;

while the first test plugin is executing, transmitting test packets to the first DUT and receiving packets from the first DUT, wherein the first test plugin generates statistics regarding latency of the first DUT in processing the test packets; and reporting, from the first DUT and to the test system, results generated from execution of the first test plugin, wherein reporting the results includes reporting the statistics regarding the latency of the first DUT in processing the test packets.

2. The method of claim 1 comprising installing a test interface on the first DUT, wherein transmitting the first test plugin to the first DUT includes transmitting the first test plugin to the first DUT via the test interface and wherein reporting the results generated from execution of the first test plugin includes transmitting the results to the test system via the test interface.

3. The method of claim 1 wherein injecting the first test plugin into the user-space network protocol stack executing on the first DUT includes injecting the first test plugin into a pluginized user-space network protocol stack executing on the first DUT.

4. The method of claim 2 wherein injecting the first test plugin into the pluginized user-space network protocol stack executing on the first DUT includes injecting the first test plugin into a pluginized QUIC network protocol stack executing on the first DUT.

5. The method of claim 1 wherein transmitting the first test plugin to the first DUT includes transmitting machine language code to the first DUT.

6. The method of claim 1 wherein transmitting the first test plugin to the first DUT includes transmitting a Berkeley packet filter (BPF) test plugin to the first DUT.

7. The method of claim 1 wherein executing the first test plugin on the first DUT includes executing the first test plugin within a same process as the user-space network protocol stack.

8. The method of claim 1 comprising, at the test system, receiving the results indicating the statistics regarding the latency of the first DUT in processing the test packets generated from the execution of the first test plugin on the first DUT and, based on the results, selecting and transmitting a second test plugin to the first DUT, wherein the second test plugin is different from the first test plugin.

9. The method of claim 1 comprising, at the test system, receiving the results generated from the execution of the first test plugin on the first DUT and, based on the results, selecting and transmitting a second test plugin to a second DUT, wherein the second DUT is different from the first DUT.

10. The method of claim 8 wherein the statistics regarding latency of the first DUT in processing the test packets include statistics regarding latency of a first layer of the user-space network protocol stack of the first DUT and the second test plugin is configured to generate statistics regarding latency of a second layer of the user-space network protocol stack different from the first layer.

11. A system for injecting a test plugin into a user-space network protocol stack executing on a device under test (DUT) and executing the test plugin during testing of the DUT, the system comprising:

a first test plugin for testing or measuring an operational aspect of a first DUT;

a test platform including at least one processor and a memory; a test controller executable by the at least one processor for transmitting the first test plugin to the first DUT, transmitting test packets to the first DUT and receiving packets from the first DUT; and a test interface located on the first DUT for injecting the first test plugin into a user-space network protocol stack executing on the first DUT while the user-space network protocol stack is executing, wherein the first DUT executes the first test plugin while the first DUT is processing the test packets, the first test plugin generates statistics regarding latency of the first DUT in processing the test packets, and the test interface reports, to the test controller, results indicating the statistics regarding latency of the first DUT in processing the test packets.

12. The system of claim 11 wherein the user-space network protocol stack comprises a pluginized user-space network protocol stack.

13. The system of claim 12 wherein the pluginized user-space network protocol stack comprises a pluginized QUIC network protocol stack.

14. The system of claim 11 wherein the first test plugin comprises machine language code.

15. The system of claim 11 wherein the first test plugin comprises a Berkeley packet filter (BPF) test plugin.

16. The system of claim 11 wherein the first test plugin is configured to execute within a same process as the user-space network protocol stack.

17. The system of claim 11 wherein the test controller is configured to receive the results indicating the statistics regarding the latency of the first DUT in processing the test packets generated from the execution of the first test plugin on the first DUT, and, based on the results, select and transmit a second test plugin to the first DUT, wherein the second test plugin is different from the first test plugin.

18. The system of claim 11 wherein the test controller is configured to receive the results generated from the execution of the first test plugin on the first DUT, and, based on the results, select and transmit a second test plugin to a second DUT, wherein the second DUT is different from the first DUT.

19. The system of claim 17 wherein the statistics regarding latency of the first DUT in processing the test packets include statistics regarding latency of a first layer of the user-space network protocol stack of the first DUT and the second test plugin is configured to generate statistics regarding latency of a second layer of the user-space network protocol stack different from the first layer.

20. A non-transitory computer readable medium having stored thereon executable instructions that when executed by a processor of a computer control the computer to perform steps comprising:

transmitting, from a test system and to a device under test (DUT), a test plugin;

injecting the test plugin into a user-space network protocol stack executing on the DUT while the user-space network protocol stack is executing;

executing the test plugin;

while the test plugin is executing, transmitting test packets to the DUT and receiving packets from the DUT, wherein the first test plugin generates statistics regarding latency of the first DUT in processing the test packets; and reporting, from the DUT and to the test system, results generated from execution of the test plugin, wherein reporting the results includes reporting the statistics regarding the latency of the first DUT in processing the test packets.

21. The non-transitory computer readable medium of claim 20 comprising, at the test system, receiving the statistics regarding the latency of the first DUT in processing the test packets generated from the execution of the first test plugin on the first DUT and, based on the results, selecting and transmitting a second test plugin to the first DUT, wherein the second test plugin is different from the first test plugin, the statistics regarding latency of the first DUT in processing the test packets include statistics regarding latency of a first layer of the user-space network protocol stack of the first DUT and the second test plugin is configured to generate statistics regarding latency of a second layer of the user-space network protocol stack different from the first layer.

* * * * *